(12) United States Patent
Anderson et al.

(10) Patent No.: US 6,261,053 B1
(45) Date of Patent: Jul. 17, 2001

(54) COOLING ARRANGEMENT FOR GAS-TURBINE COMPONENTS

(75) Inventors: Gordon Anderson, Baden (CH); Jörgen Ferber, Küssaberg (DE); Kenneth Hall, Gainsville, GA (US); Michael Hock, München (DE); Fathi Tarada, Kehrsatz (CH); Bernhard Weigand, Waldshut-Tiengen (DE)

(73) Assignee: Asea Brown Boveri AG, Baden (CH)

( * ) Notice: Subject to any disclaimer, the term of this patent is extended or adjusted under 35 U.S.C. 154(b) by 0 days.

(21) Appl. No.: 09/151,809

(22) Filed: Sep. 14, 1998

(30) Foreign Application Priority Data

Sep. 15, 1997 (EP) .................................. 97810659

(51) Int. Cl.[7] ...................................................... F01D 5/14
(52) U.S. Cl. ................................................................ 415/115
(58) Field of Search .................................. 415/115, 134, 415/136, 137, 138, 139, 208.2

(56) References Cited

U.S. PATENT DOCUMENTS

| | | | |
|---|---|---|---|
| 3,801,220 | * 4/1974 | Beckershoff | 416/198 |
| 3,975,114 | * 8/1976 | Kalkbrenner | 415/138 X |
| 4,311,432 | * 1/1982 | Kildea | 415/115 |
| 4,650,394 | * 3/1987 | Weidner | 415/115 |
| 4,902,198 | * 2/1990 | North | 415/115 |
| 5,020,970 | * 6/1991 | Dussourd et al. | 415/115 |
| 5,088,888 | * 2/1992 | Bobo | 415/134 X |
| 5,167,485 | * 12/1992 | Starkweather | 415/115 |
| 5,374,161 | * 12/1994 | Kelch et al. | 415/139 |
| 5,823,741 | * 10/1998 | Predmore et al. | 415/134 |

FOREIGN PATENT DOCUMENTS

| | | | |
|---|---|---|---|
| 2280935A | 2/1995 | (GB) . | |
| 60-22002 | * 2/1985 | (JP) | 415/139 |
| WO94/12765 | 6/1994 | (WO) . | |

* cited by examiner

Primary Examiner—John E. Ryznic
(74) Attorney, Agent, or Firm—Burns, Doane, Swecker & Mathis, L.L.P.

(57) ABSTRACT

A hot-gas stream (40) flows along the surface of a segment arrangement for shroud bands, in particular in a gas turbine. The segment arrangement comprises segments (20, 20') arranged next to one another and in each case separated from one another by a gap (12). The hot-gas stream (40), in at least one section (70) of the gap (12), has a velocity component perpendicular to the direction of the gap from a first segment (20) to a second segment (20'). In this case, in said section (70), along that edge (26) of the first segment (20) which faces the gap (12), at least one film-cooling bore (52) connects a cooling-air chamber (50), allocated to the first segment, to the surface (22) subjected to the hot-gas stream (40), and/or, in said section (70), along that edge (26') of the second segment (20') which faces the gap (12), at least one edge-cooling bore (56) connects a cooling-air chamber (50'), allocated to the second segment, to the inside (28') of the gap (12).

23 Claims, 8 Drawing Sheets

COOLING ARRANGEMENT FOR GAS-TURBINE COMPONENTS

FIELD OF THE INVENTION

The invention relates to a segment arrangement for platforms, in particular in a gas turbine, along the surface of which a hot-gas stream flows, having segments arranged next to one another and in each case separated from one another by a gap, the hot-gas stream, in at least one section of the gap, having a velocity component perpendicular to the direction of the gap from a first segment to a second segment.

BACKGROUND OF THE INVENTION

In order to achieve a maximum turbine output, it is advantageous to work at the highest possible gas temperatures. In modern gas turbines, the temperatures are so high that many components have to be cooled, since otherwise the temperature of the components which is permissible for maximum durability would be exceeded. A suitable design and/or cooling of critical components is therefore of crucial importance in modern gas turbines. The cooling problem of platforms occurs to an increased extent in annular combustion chambers, since the latter produce a very uniform temperature profile at the entry to the turbine. This means that the platform of the blade has to bear almost the average hot-gas temperature. To achieve the lowest possible NOx emissions, virtually the entire proportion of the combustion air is delivered through the burners themselves in modern combustion chambers; the proportion of the cooling air for the film cooling of the combustion chamber is therefore reduced. This likewise leads to a more uniform temperature profile at the turbine entry and thus to increased thermal loading.

Critical components in turbines are, inter alia, heat shields, combustion-chamber segments and combustion-chamber plates, moving and guide blades, inner and outer shroud bands of the moving and guide blades, and also moving- and guide-blade platforms.

In particular at the sides of segments (platforms) arranged next to one another, experience shows that increased thermal loading often occurs. If, for instance, the segments of a platform are coated with a heat-insulating coating, peeling of the coating is often found. This results in a weak point, at which oxides rapidly form, and these oxides in turn encourage the peeling of the coating. Large uncoated metal surfaces can thus be subjected to the hot-gas stream in a short time.

SUMMARY OF THE INVENTION

Accordingly, one object of the invention is to design the components which are critical with regard to high temperatures, in particular components composed of segments, in such a way that the thermal loading of these components is effectively reduced with the simplest possible means.

This object is achieved according to the invention in a first aspect in that that edge of each segment which is subjected to the hot-gas stream is set back from the impinging hot-gas stream.

The hot-gas stream flows along the surface of the segments, which are arranged next to one another and are in each case separated from one another by a gap. It can now be found that the boundary layer separates at the gap located between the platforms arranged next to one another. The boundary layer then forms again at that side edge of the downstream platform which is acted upon by the hot-gas stream. Very high heat transfer and thus increased thermal loading of the exposed material therefore occur at this point due to the very thin boundary layer. If there are protruding steps at the gap due to production tolerances, the material of these steps is subjected to especially high thermal loading by the impinging hot-gas stream. Furthermore, hot gas can be deflected into the gap by the edges and in particular by projecting steps. This may lead to a reduced service life and also often to damage to the components adjoining the gap.

A remedy is provided here by that edge of each segment which is acted upon by the hot-gas stream being set back according to the invention by bevelling or rounding off the edge. In this case, the edge need not be bevelled or rounded off over its entire length, since the direction of the hot-gas stream on the segment can change. A precondition for the applicability of the invention, however, is that the hot-gas stream, in at least one section of the gap between the segments, has a velocity component perpendicular to the direction of the gap and thus points from a first to a second segment. In this section, that edge of the second segment which faces the gap is acted upon by the hot-gas stream and is therefore rounded off or bevelled in the first aspect of the invention.

In the case just described, the hot gas flows over the gap, which separates two segments, from the surface of the first segment to the surface of the second segment. In this case, the main component of the velocity of the hot-gas stream is mostly directed from the front side to the rear side of the segments, that is, along the gap. In addition to this flow across the segments, the hot-gas stream has a velocity component perpendicular or at right angles to the gap. Only this perpendicular velocity component leads to the segment edges being acted upon by the hot-gas stream. In many applications, the hot-gas stream on the second segment changes its direction, for instance owing to the fact that a guide device or an airfoil part is put on each segment. In this case, the velocity component along the gap is largely retained; the velocity component perpendicular to the gap merely reverses. The result of this is that there is then a second section downstream of the first section in which the hot-gas stream flows from the first to the second segment, in which second section the hot-gas stream flows from the second segment over the gap to the surface of the first segment. In this second section, that edge of the first segment which faces the gap is then advantageously rounded off or bevelled, since in this section this edge is acted upon by the hot-gas stream.

In a transition region between the first and the second section, the hot-gas stream will flow essentially parallel to the direction of the gap. It is now advantageous if the bevels or rounded-off portions of the first and second sections respectively are gradually reduced to zero in this transition region.

The segment arrangements described here generally involve a multiplicity of segments which are arranged next to one another, so that in each case two segments are separated from one another by a gap. The segment arrangement as a unit may form, for example, a closed ring or it may be arranged on the inside or outside on the circumference of a cylinder. As a rule, the segments are identical, except for any end pieces, so that it always suffices in the present invention to describe a single segment. If a first and a second segment are referred to in the present invention, this relates to two segments which are selected as an example and lie on the two sides of a gap. This serves to illustrate the direction of the gas flow and does not mean that the invention is restricted to only two segments. The gap between two segments may vary statistically due to production tolerances, and in the extreme case may even be omitted at individual segments as a result.

Within the scope of the first aspect of the present invention, the edges are bevelled at an angle α of between 1 and 60 degrees, preferably between 20 and 40 degrees, and in particular preferably less than about 30 degrees. If the bevel extends over a length L perpendicular to the gap, the depth T of the bevel is related to the length L and the angle α via tan α=T/L. In general, the maximum depth is predetermined, for instance by a recess in the interior of the segments, in which recess a sealing strip, for example, is located. It has been found that, with this selection of the angle, a depth of less than the maximum depth and a corresponding length of the bevel, the risk of separation of the boundary layer at the gap is markedly reduced.

It is also advantageous for the stability of the boundary layer if the transition points between the bevelled region and the inside of the gap, and/or between the bevelled region and the unaltered surface of the segment are not of abrupt design but are rounded off, for instance in the form of an elliptical section.

As an alternative to the bevel, the entire set-back portion of the edge may also be effected by a rounded-off portion, advantageously in the form of an elliptical section. The projection of the rounded-off portion to the front side then shows a quarter ellipse, the ellipse having semiaxes of length L and T respectively. It has also been found here that the risk of separation of the boundary layer at the gap is markedly reduced if L and T are selected in such a way that the angle α=arc tan (T/L) is between 1 and 60 degrees, preferably between 20 and 40 degrees, in particular preferably around about 30 degrees. Here, too, the depth T is limited by the maximum depth.

Production tolerances during the manufacture of the segments are also to be taken into account when selecting the depth T. The predetermined depth T is advantageously selected in such a way that, when the tolerances are taken into account, at least a large percentage, for example more than 50%, of all segments are set back by the bevel or rounded-off portion.

In accordance with the above explanations, in each case a certain value, e.g. T1 in the first section and T2 in the second section, is selected for the depth T in the first and the second sections respectively in case the hot-gas stream on the segment changes its direction. Both values are selected so as to be smaller than the maximum depth. In the transition region, T1 and T2 are now gradually reduced to zero. This may be effected linearly or advantageously in an arc of a circle or an ellipse.

Although the first aspect of the invention already leads to a significant reduction in the thermal loading of the segment edges, for components having very high thermal loading, such as, for instance, the inlet guide blades in gas turbines, further measures for achieving the maximum service life of the components are often advantageous. Thus the object is achieved according to the invention in a second aspect in that a suitable arrangement of film-cooling bores and/or edge-cooling bores in the segment directs cooling air from a cooling-air chamber to the surface subjected to the hot-gas stream.

In this aspect of the invention, a cooling-air chamber is advantageously allocated to each segment. In this case, a different cooling-air chamber may be provided for each segment, but the same cooling-air chamber may also be allocated to a plurality of segments. Again, a precondition for the applicability of the invention is that the hot-gas stream, in at least one section of the gap between the segments, has a velocity component perpendicular to the direction of the gap and thus points from a first to a second segment. In this section, at least one film-cooling bore is made along that edge of the first segment which faces the gap. These film-cooling bores may have any shape; they are preferably cylindrical and/or funnel-shaped and in particular preferably cylindrical on the side of the cooling-air chamber and open in a funnel shape toward the hot-gas side. The axis of the film-cooling bores advantageously points not against the direction of flow of the hot gas but toward the gap and encloses with the surface an angle of 10 to 50 degrees, preferably 25 to 45 degrees, in particular preferably about 35 degrees. As a result, a cooling-air film forms on the surface of the segment in the vicinity of that edge of the adjacent segment which is acted upon by the hot-gas stream, and this cooling-air film cools and thus protects the edge. The action of the cooling film is optimized due to the relatively small angle between bore and surface.

In addition, at least one edge-cooling bore may advantageously be made along that edge of the second segment which faces the gap. The edge-cooling bores begin in the cooling-air chamber allocated to the segment and point toward the gap like the film-cooling bores. The edge-cooling bores may be of any shape; they are preferably of cylindrical shape. Unlike the film-cooling bores of the adjacent segment, the edge-cooling bores do not end at the surface subjected to the hot-gas stream but lead into the gap separating the segments. In this case, care is to be taken to ensure that the angle of the edge-cooling bores is kept so small that the discharging cooling air is not blown immediately into the hot gas, since otherwise excessive losses would occur, since the cooling air is blown out against the direction of flow of the hot gas. The edge-cooling bores enclose with the surface an angle of 5 to 50 degrees, preferably 20 to 40 degrees, in particular preferably about 30 degrees. The purpose of the edge-cooling bores is to provide a cooling-air region in the gap, which cooling-air region acts as a convective heat sink. The edge-cooling bores blow the cooling air into the gap between the segments and thus provide for adequate cooling in the gap. Therefore, the combination of film-cooling bores and edge-cooling bores, on the one hand, delivers a protective cooling-air layer for that side edge of each segment which is acted upon by the hot-gas stream and, on the other hand, provides a heat sink in the separating gap due to the edge-cooling bores, and this heat sink convectively dissipates the heat flow introduced by the hot-gas stream.

Here, too, a second section may be formed in the gap by reversing the direction of flow of the hot-gas stream, in which second section the hot-gas stream flows from the second segment over the gap to the surface of the first segment. In this second section, the arrangement of the film-cooling bores and edge-cooling bores is reversed; at least one film-cooling bore is therefore made there along that edge of the second segment which faces the gap, and at least one edge-cooling bore is made along that edge of the first segment which faces the gap. In a transition region between the first and second sections, the hot-gas stream will flow essentially parallel to the direction of the gap. In this transition region, at least one edge-cooling bore is advantageously made along the edge of each of the two segments which faces the gap. There are therefore no film-cooling bores in the transition region. However, the convective heat extraction provided by the edge-cooling bores is retained for cooling purposes.

If there is a recess, which, for example, contains a sealing strip, in the interior of the segments, the film-cooling bores and edge-cooling bores are made in such a way that they do not intersect this recess.

The film-cooling bores and edge-cooling bores may be made opposite one another at the gap. In a preferred development, however, the film-cooling bores and the edge-cooling bores are staggered laterally, that is, in the direction of the gap. In a further preferred development, the film-cooling bores and/or the edge-cooling bores have a lateral setting angle. The bores are advantageously made with such a setting angle that their axes point approximately in the direction of the hot-gas stream.

In a further embodiment, the first and second aspects of the invention are advantageously combined. The essential features of the comments made about the first and second aspects also apply to the following discussion of this embodiment and the further embodiments. It is also particularly the case that, for the invention, there is at least one section having a hot-gas-stream velocity component perpendicular to the gap, but that there may also be, in addition, a second section having an opposed perpendicular velocity component and a transition region. In this embodiment, film-cooling bores and/or edge-cooling bores are now made as in the second aspect of the invention. In addition, that edge of each segment which is acted upon by the hot gas is bevelled or rounded off, as described in the first aspect of the invention. If edge-cooling bores are provided, the edge-cooling bores and bevel or rounded-off portion, in the one section, and, if present, in the second section, are matched to one another in such a way that the depth of the set-back portion reaches up to the gap-side opening of the edge-cooling bore. The end region of the edge-cooling bores is thereby covered by the bevel or rounded-off portion, as a result of which the edge-cooling bores remain open, even if the gap width should be reduced to zero by production tolerances or transient conditions during operation.

In a further embodiment, film-cooling bores and/or edge-cooling bores are likewise made as in the second aspect of the invention. In addition, that edge of each segment which is acted upon by the hot gas is bevelled or rounded off, as described in the first aspect of the invention. Here, in contrast to the embodiment described previously, the edge-cooling bores and bevel or rounded-off portion are matched to one another in such a way that the depth of the set-back portion does not reach the gap-side opening of the edge-cooling bore. On the other hand, the inside, facing the gap, of the segment opposite the bevelled segment is provided with a concave, for example roughly parabolic, recess, so that the cooling-air stream discharging from the edge-cooling bore is deflected at this recess. In the interior of the edge-cooling bore, the cooling-air stream first of all flows essentially against the direction of the hot-gas stream. Due to the deflection, the cooling-air stream then leaves the gap essentially parallel to the hot-gas stream. This cooling-air stream can thus also form a protective film on the surface.

If there are two sections having an opposed perpendicular velocity component of the hot-gas stream and a transition region in between in the embodiment described, the recess is dispensed with in the transition region. In the transition region, therefore, edge-cooling bores are arranged on both sides of the gap, as described in the second aspect of the invention, and the bevels or rounded-off portions of the respective edges, as described in the first aspect of the invention, are gradually reduced to zero.

In a further embodiment, in the one section of the gap in which the hot-gas stream has a velocity component from a first segment to a second segment, at least one edge-cooling bore is made along that edge of the first segment which faces the gap. These edge-cooling bores form with the surface an angle $\beta$ and do not end at the surface subjected to the hot-gas stream but lead into the gap separating the segments. As described in the first aspect of the invention, that edge of the second segment which is acted upon by the hot-gas stream is bevelled or rounded off at an angle $\alpha$. In this case, the angle $\beta$ is selected to be in a range of around 30 degrees around the angle $\alpha$. Due to the combination of upstream edge-cooling bore and the downstream set-back portion of the opposite edge, the discharging cooling-air film does not remain restricted to the volume of the gap. On the contrary, it first of all forms a protective cooling-air layer over the bevel or rounded-off portion and then discharges onto the surface around which the hot-gas stream flows. On account of the selected orientation of the edge-cooling bore and bevel, the cooling-air stream discharges essentially parallel to the direction of the hot-gas stream, as a result of which an optimum cooling-air film is produced. This embodiment, too, offers the advantage that the edge-cooling bores remain open, even if the gap width should be reduced to zero by production tolerances and/or transient conditions during operation.

All aspects and embodiments described may be combined with one another within the scope of the invention in order to reduce the thermal loading of critical components as far as possible. Even though the invention has been described above for one segment arrangement, in particular for a gas turbine, the invention may nonetheless be advantageously used in the case of all critical components which are composed of segments and are subjected to a hot-gas stream, such as, for example, heat shields, combustion-chamber segments and combustion-chamber plates, moving and guide blades, inner and outer shroud bands of the moving and guide blades, and also moving- and guide-blade platforms. Use is not restricted to gas turbines; other hot-gas systems, for instance aircraft turbines, are also within the scope of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Figure 1:
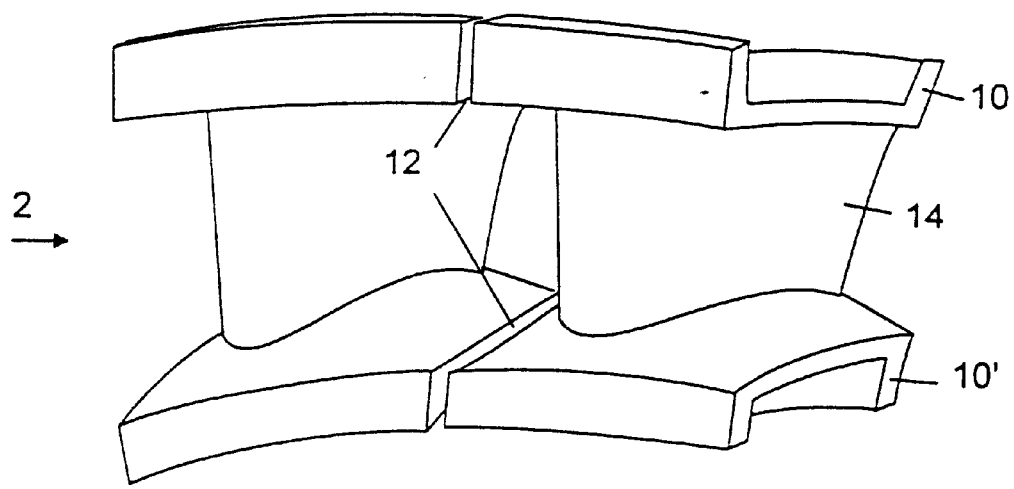
FIG. 1 shows a schematic perspective view of the guide-blade platforms of a gas turbine.
Figure 2:
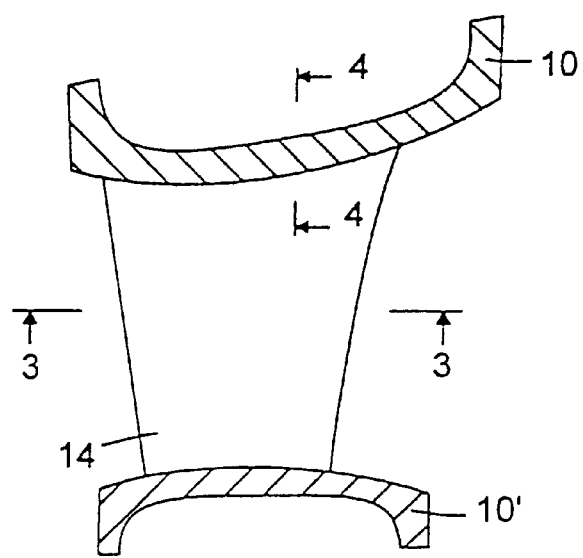
FIG. 2 shows a side view of the guide-blade platform from direction 2 in FIG. 1.

Only the elements essential for the understanding of the invention are shown. Not shown are, for example, the complete guide blade ring, the combustion chamber and the exhaust-gas casing of the gas turbine with exhaust-gas tube and stack.

DESCRIPTION OF THE PREFERRED EMBODIMENTS

Referring now to the drawings, wherein like reference numerals designate identical or corresponding parts throughout the several views, FIGS. 1 to 4 show various views of a guide blade of a gas turbine having an annular combustion chamber according to the prior art. The guide blade comprises a multiplicity of top and bottom platforms 10 and 10' and in each case an airfoil piece 14 arranged in between. In each case two of the top and bottom platforms (generally: segments) are separated from one another by a gap 12.

Figure 3:
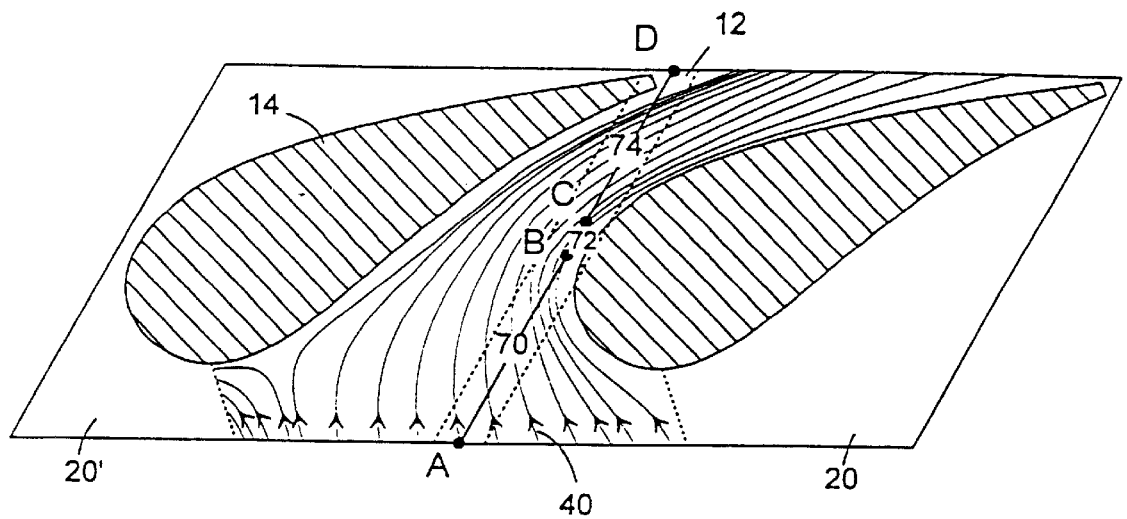
FIG. 3 shows a bottom view of the bottom platform from direction 3—3 in FIG. 2 with depiction of the particle trajectories of the hot-gas stream.

FIG. 3 shows a bottom view of two top platforms 10 lying next to one another. All explanations equally apply to top and bottom platforms; the platforms are therefore generally designated as segments 20, 20'. In FIG. 3, the particle flow lines of the hot-gas stream 40 are depicted on the surface of the segments. These flow lines are obtained by computer simulation or by direct measurement of worn-out components. The hot-gas stream 40 essentially has a velocity component along the gap 12. In addition, there is a transverse component (also: perpendicular velocity component), which results in the hot-gas stream leading from one segment across the gap to the adjacent segment. In FIG. 3, the transverse component reverses its sign due to the effect of the airfoil piece 14. In one section 70 of the gap, between the points A and B, the hot-gas stream flows from the first segment 20 toward the second segment 20'. In a second section 74 of the gap, between the points C and D, the reverse is the case, i.e. the hot-gas stream flows from the second segment 20' to the first segment 20. In a transition region 72, the direction of the hot-gas stream is essentially parallel to the direction of the gap 12.

Figure 4:
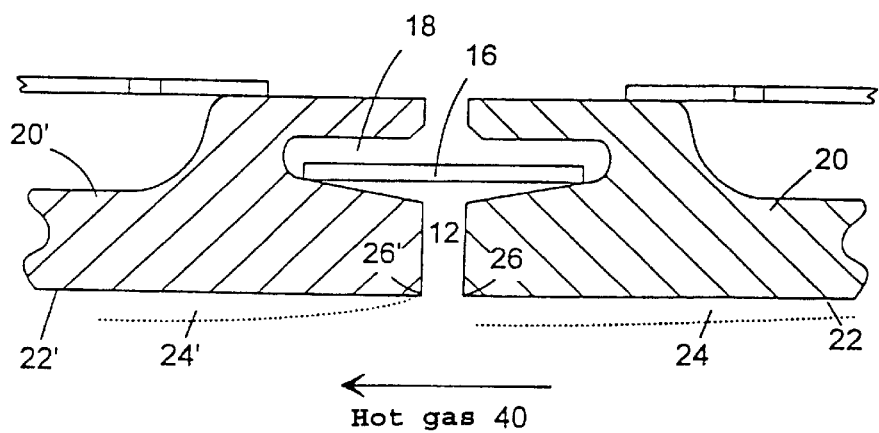
FIG. 4 shows a section of the connecting point between two platform segments in direction 4—4 in FIG. 2 (prior art)

FIG. 4 shows a section of the connecting point between two segments in detail. The recess 18 arranged in the interior of the segments 20 and 20' contains a sealing strip 16. The hot-gas stream 40 flows along the surfaces 22 and 22' of the segments 20 and 20'. In this case, the main component of the hot-gas stream in FIG. 4 goes into the plane of the paper. In addition, there is in general a transverse direction, which in FIG. 4 is identified by an arrow. With the specified orientation, FIG. 4 shows a section in the first section 70 (between the points A and B in FIG. 3). If the transverse component points approximately as in FIG. 4 from the first segment 20 to the second segment 20', experience shows that the boundary layer 24 separates at the gap 12. Although it forms again at the second segment 20' (reference numeral 24'), it is very thin directly at the edge 26'. Consequently, increased thermal loading of the segment material occurs in the region of the edge 26'.

Figure 5:
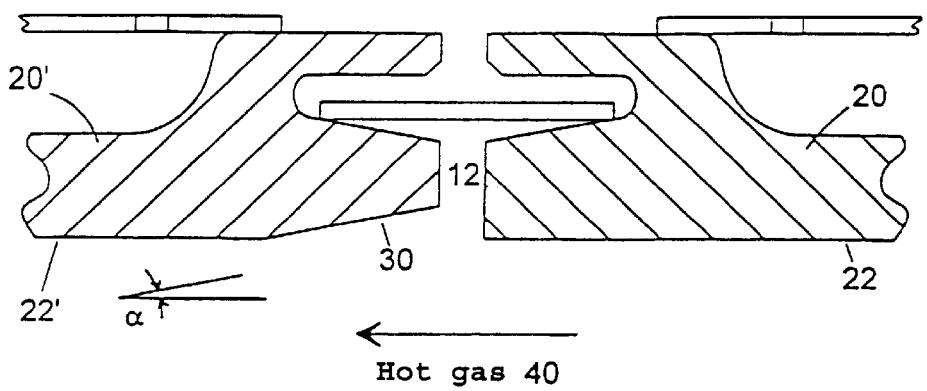
FIG. 5 shows a section like FIG. 4 in a first exemplary embodiment of the invention.
Figure 6A:
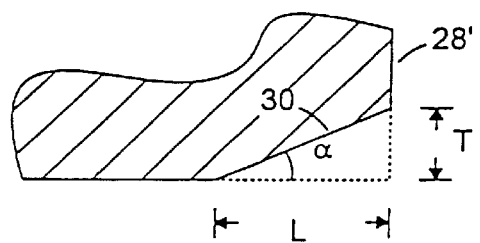
FIG. 6a shows a detail view of FIG. 5 in the region of the bevel/rounded-off portion of the downstream segment.

FIG. 5 shows a first exemplary embodiment in accordance with the first aspect of the invention. In the first exemplary embodiment, in the case of a transverse component from the first segment 20 to the second segment 20', the edge acted upon by the hot-gas stream is set back by bevelling at an angle of about 30 degrees (reference numeral 30). It has been found that, as a result, the boundary layer 24 of the first segment 20 situated upstream does not separate at the gap 12. The depth T of the bevel is selected in such a way that the bevel does not extend up to the recess 18 containing the sealing strip 16. The bevel 30 as just described is shown in FIG. 6a; alternative modifications are shown in detail in FIG. 6b and 6c.

Figure 6B:
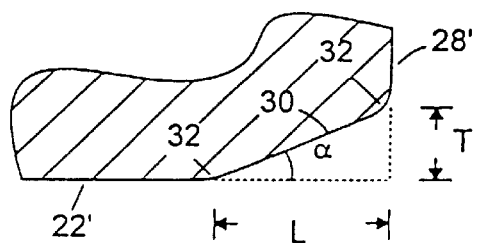
FIG. 6b shows a detail view of a modification of FIG. 5 in the region of the bevel/rounded-off portion of the downstream segment.
Figure 6C:
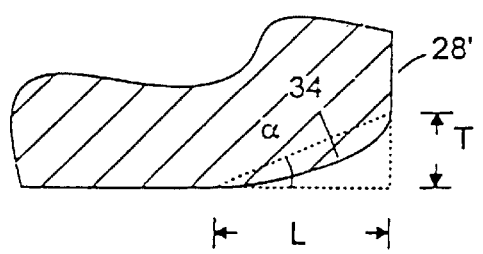
FIG. 6c shows a detail view of a further modification of FIG. 5 in the region of the bevel/rounded-off portion of the downstream segment.

In FIG. 6b, the transition between the bevelled surface 30 and the inside of the gap 28' is not made abrupt but is rounded off, for instance in the form of an elliptical section 32. The same applies to the transition between the bevelled surface 30 and the unaltered surface of the segment 22'. The risk of separation of the boundary layer is further reduced by this development. FIG. 6c shows that the entire set-back portion can also be made as a rounded-off portion 34. This is advantageously done in the form of a quarter ellipse as in FIG. 6c. The ellipse has semiaxes of length L and T respectively. An angle comparable with the bevel of FIG. 6a is obtained in the case of the elliptical section by the ratio of the two semiaxes. In FIG. 6c, this angle, $\alpha = \arctan(T/L)$, is selected to be the same size as in FIG. 6a, and is therefore 30 degrees here. The risk of separation of the boundary layer at the gap is also very small in this alternative.

Figure 7:
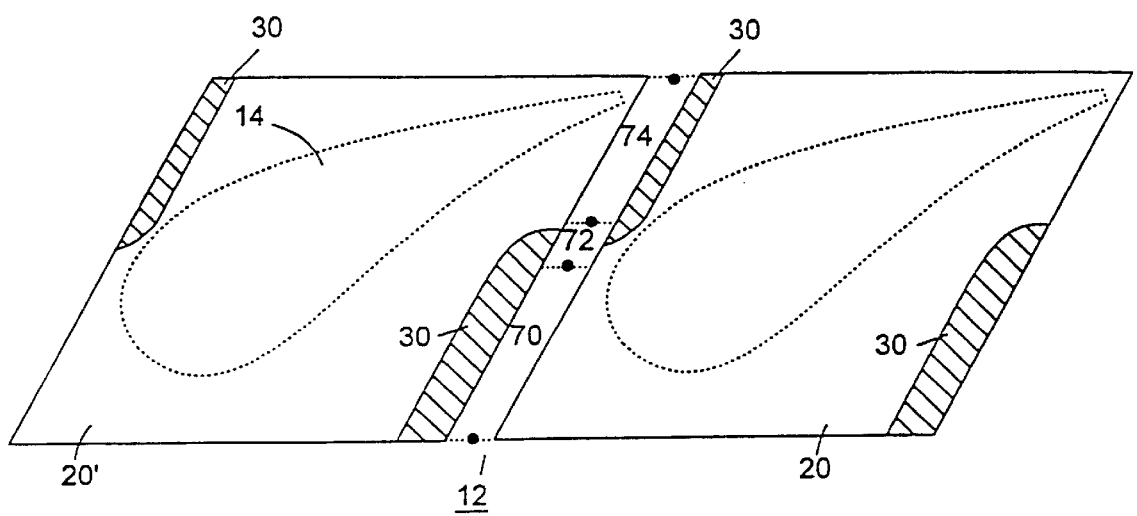
FIG. 7 shows a bottom view like FIG. 3 in the first exemplary embodiment of the invention.
Figure 8:
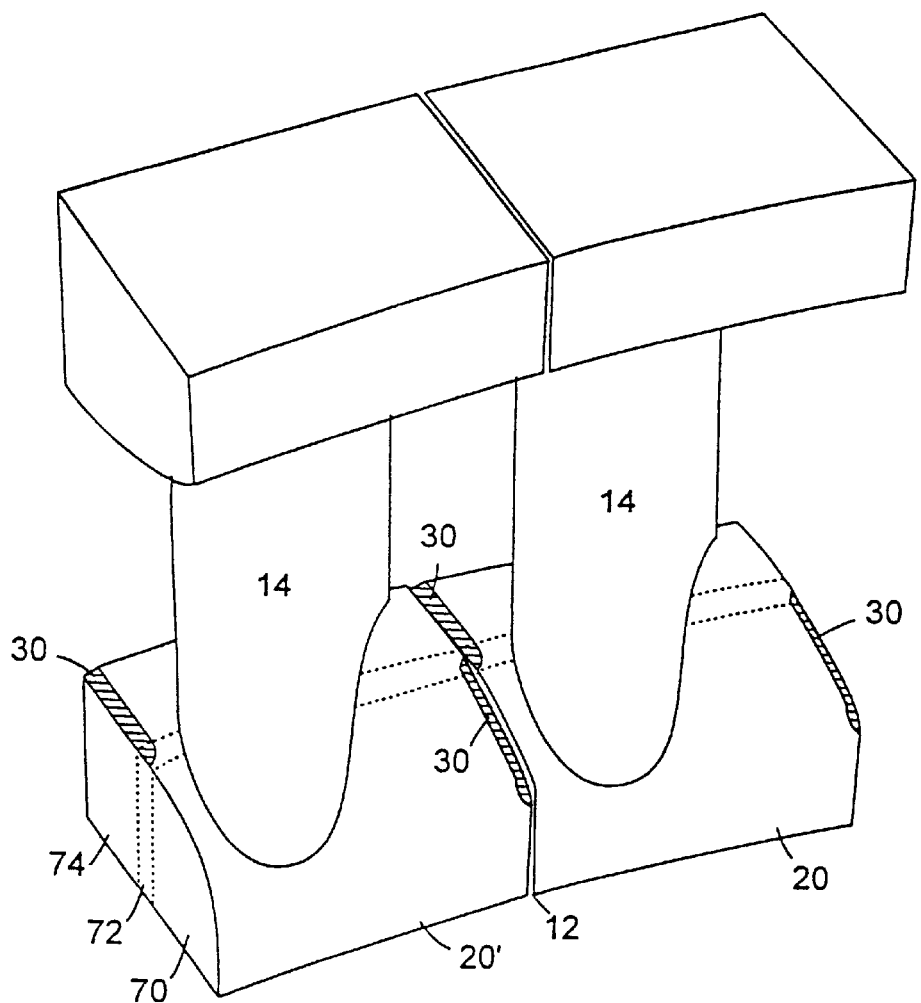
FIG. 8 shows a perspective view of two segments of a guide blade of a high-pressure turbine in the first exemplary embodiment of the invention.

According to FIG. 3, the transverse component of the velocity of the hot-gas stream in the present exemplary embodiment reverses its sign due to the effect of the airfoil piece 14. In the first section 70 of the gap, in which the hot-gas stream flows from the first segment 20 toward the second segment 20', that edge of the second segment 20' which is acted upon by the hot-gas stream is bevelled. FIGS. 7 and 8 show that, in the second section 74 of the gap, in which the hot-gas stream flows from the second segment 20' to the first segment 20, that edge of the first segment 20 which is acted upon by the hot-gas stream is bevelled. In a transition region 72 in which the direction of the hot-gas stream is essentially parallel to the direction of the gap 12, the depth of the bevel on both segments is gradually reduced to zero.

Figure 9:
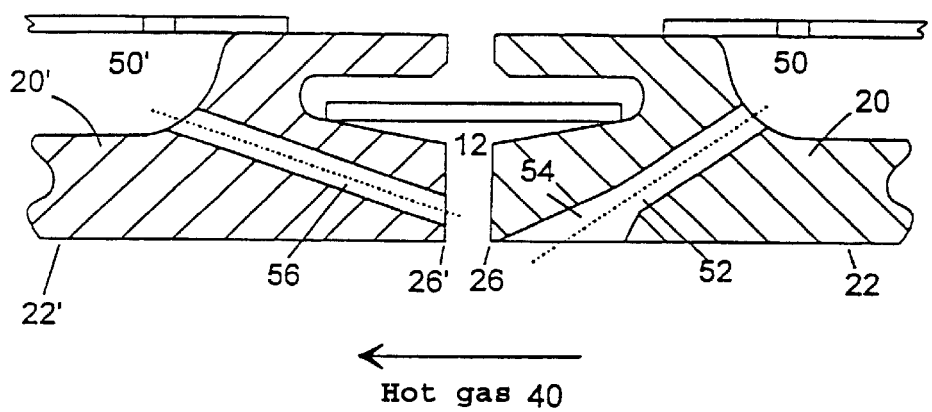
FIG. 9 shows a section like FIG. 4 in a second exemplary embodiment of the invention.

A second exemplary embodiment in accordance with the second aspect of the invention is shown in FIG. 9. The section of FIG. 9 shows the case where the transverse component of the velocity of the hot-gas stream points from the first segment 20 to the second segment 20'. In the section of the gap having this orientation, a plurality of film-cooling bores 52 are made along that edge 26 of the first segment 20 which faces the gap 12, and these film-cooling bores 52 connect the allocated cooling-air chamber 50, located here on the rear side of the segment 20, to the surface 22 subjected to the hot-gas stream. The cylindrical film-cooling bores 52 open in a funnel shape (reference numeral 54) toward the hot-gas side 22. The axis of the film-cooling bores 52 points toward the gap 12 and encloses an angle here of about 35 degrees with the surface 22.

A plurality of edge-cooling bores 56 are made along that edge 26' of the second segment 20' which faces the gap 12. They are of cylindrical shape and point toward the gap 12 at an angle of about 30 degrees. The edge-cooling bores 56 do not end at the surface 22' subjected to the hot-gas stream but lead into the gap 12. The edge-cooling bores 56 provide cooling air in the gap 12, and this cooling air cools down the penetrating hot gas, whereas the film-cooling bores 52 produce a cooling-air film in the vicinity of the edge 26' acted upon by the hot-gas stream, and this cooling-air film cools and protects the edge 26'. Due to the selected angle between the bores 52, 56 and the surfaces 22, 22', vortices and thus aerodynamic losses are avoided as far as possible. In particular, care is to be taken to ensure that the angle of the edge-cooling bores 56 is kept so small that the discharging cooling air is not blown immediately into the hot gas, since otherwise excessive losses would occur, since the cooling air is blown out against the direction of flow of the hot gas.

As in the first exemplary embodiment, the transverse component of the velocity of the hot-gas stream in the present second exemplary embodiment reverses its sign due to the effect of the airfoil piece 14. In the first section 70 of the gap, in which the hot-gas stream flows from the first segment 20 toward the second segment 20', the arrangement of the film-cooling bores 52 and edge-cooling bores 56 is as described above. In the second section 74 of the gap, in which the hot-gas stream flows from the second segment 20' toward the first segment 20, the arrangement of the film-cooling bores 52 and edge-cooling bores 56 is reversed; the film-cooling bores 52 are therefore made along that edge 26' of the second segment 20' which faces the gap 12, and the edge-cooling bores 56 are made along that edge 26 of the first segment 20 which faces the gap 12. In a transition region 72 between the first and second sections, the hot-gas stream will flow essentially parallel to the direction of the gap. In this transition region 72, in the second aspect of the invention, edge-cooling bores 56 are made along the edge 26, 26' of each of the two segments 20, 20' which faces the gap 12; there are no film-cooling bores 52 there.

Figure 10:
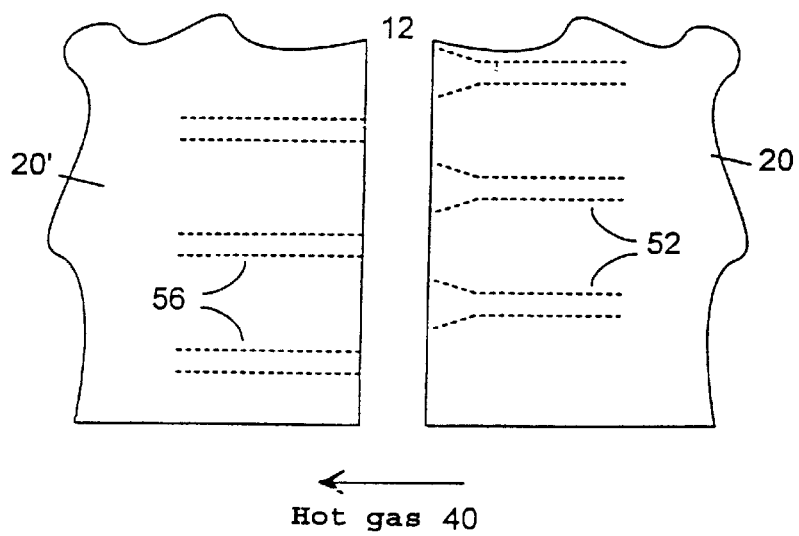
FIG. 10 shows a schematic top or bottom view of a section of two segments in accordance with a development of the second exemplary embodiment of the invention.
Figure 11:
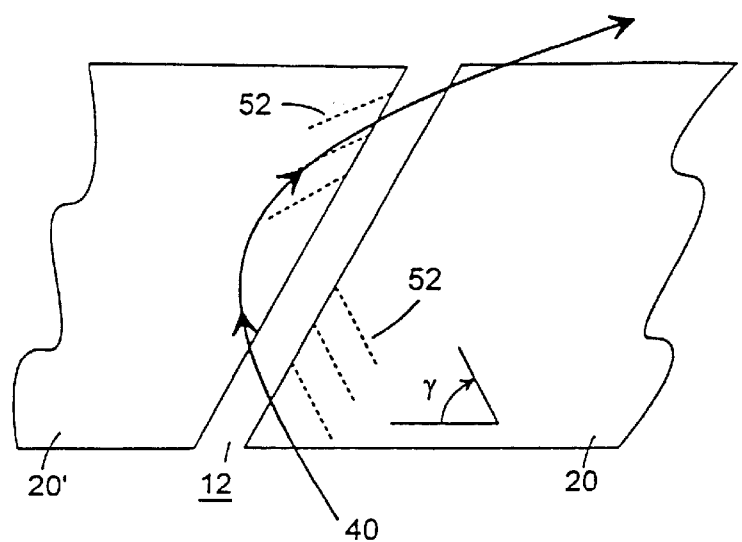
FIG. 11 shows a schematic top or bottom view of two segments in accordance with a further development of the second exemplary embodiment of the invention.

The film-cooling bores 52 and the edge-cooling bores 56 are preferably staggered laterally, as shown schematically in the bottom view of FIG. 10. In a further development, the film-cooling bores 52 and the edge-cooling bores 56 have a lateral setting angle γ in such a way that the axes of the bores, in all sections, point approximately in the direction of the hot-gas stream 40. For the sake of clarity, only the film-cooling bores 52 are depicted in FIG. 11, but correspondingly set edge-cooling bores 56 are likewise included in a preferred development.

Figure 12:
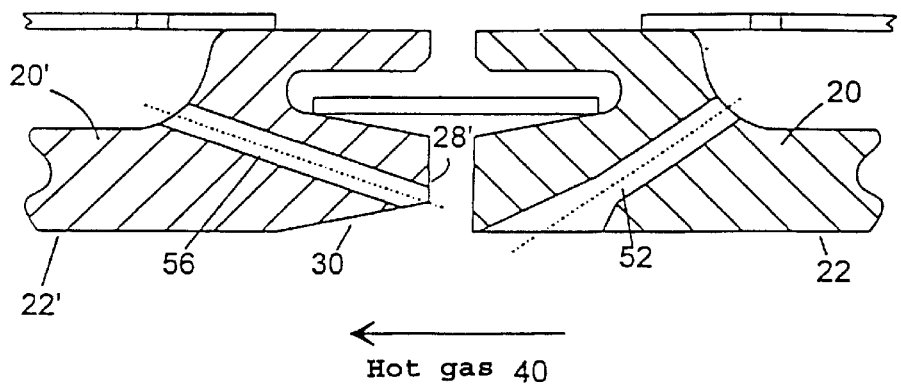
FIG. 12 shows a section like FIG. 4 in a third exemplary embodiment of the invention.

In a third exemplary embodiment (FIG. 12), the first and second aspects of the invention are advantageously combined. In this case, film-cooling bores 52 and edge-cooling bores 56 are made as in the second exemplary embodiment. In addition, that edge of each segment which is acted upon by the hot gas is bevelled as in the first exemplary embodiment. In this case, the bevel 30 and the edge-cooling bores 56 are matched to one another in such a way that the depth of the bevel 30 reaches up to the opening of the edge-cooling bore 56 on the inside 28' of the gap 12. The gap-side end region of the edge-cooling bores 56 is thereby covered by the bevel 30, and the edge-cooling bores 56 remain open, even if the gap width should be reduced to zero by production tolerances or transient conditions during operation. The configuration of the segments in the individual sections is as described in the first and second exemplary embodiments respectively.

Figure 13:
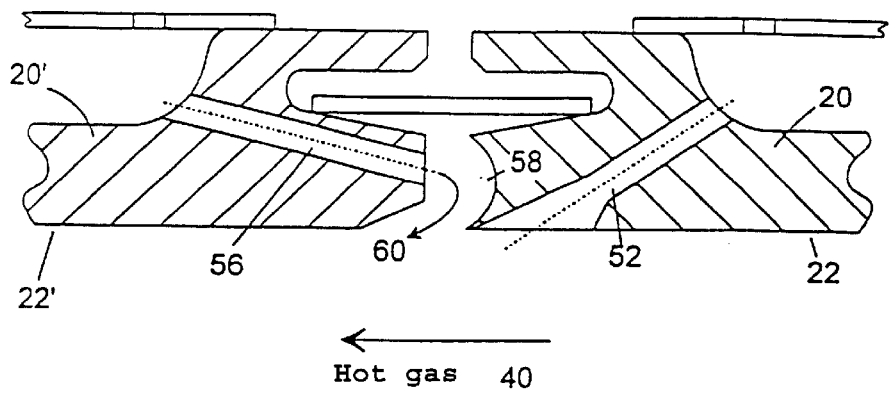
FIG. 13 shows a section like FIG. 4 in a fourth exemplary embodiment of the invention.

In a fourth exemplary embodiment (FIG. 13), film-cooling bores 52 and edge-cooling bores 56 are likewise made as in the second exemplary embodiment, and that edge of each segment which is acted upon by the hot gas is bevelled as in the first exemplary embodiment. In contrast to the third exemplary embodiment, the depth of the bevel 30 here does not reach the edge-cooling bores 56. In addition, the inside 28 facing the gap 12 is provided with a roughly parabolic recess 58, so that the cooling-air stream 60 discharging from the edge-cooling bore is deflected at the recess 58. Whereas the cooling-air stream 60 in the interior of the edge-cooling bore 56 flows essentially against the direction of the hot-gas stream 40, the cooling-air stream 60, due to the deflection, leaves the gap 12 at the surface 22' essentially parallel to the hot-gas stream 40. As a result, undesirable vortices are avoided as far as possible, and a protective cooling-air film 60 is also delivered by the edge-cooling bores 56. In the second section, film-cooling bores 52 and edge-cooling bores 56 as well as bevel 30 and recess 58 are reversed in a manner analogous to the previous exemplary embodiments. In the transition region, edge-cooling bores 56 are made on both sides of the gap as in the second exemplary embodiment, the depth of the bevels 30 is gradually reduced to zero, and no recesses 58 are made on the insides 28, 28' of the gap.

Figure 14:
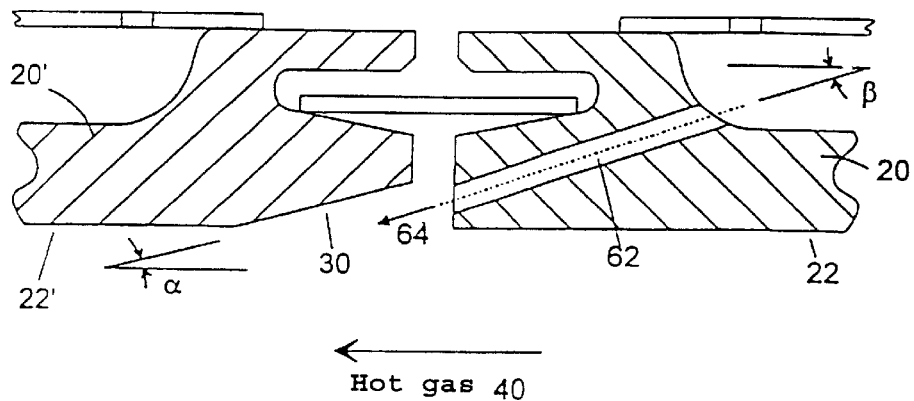
FIG. 14 shows a section like FIG. 4 in a fifth exemplary embodiment of the invention.

In a fifth exemplary embodiment (FIG. 14), in the section 70 of the gap in which the hot-gas stream has a velocity component from the first segment 20 to the second segment 20', a plurality of edge-cooling bores 62 are made along that edge 26 of the first segment which faces the gap 12. These edge-cooling bores 62 form with the surface 22 an angle β, here about 40 degrees. The edge-cooling bores 62 do not end at the surface 22 subjected to the hot-gas stream 40 but lead into the gap 12. As in the first exemplary embodiment, that edge 26' of the second segment 20' which is acted upon by the hot-gas stream 40 is bevelled at an angle α, here about 30 degrees. Due to the combination of the edge-cooling bore 62 lying upstream with the bevel 30 lying downstream, the cooling-air stream 64 discharging from the edge-cooling bore 62 does not remain restricted to the volume of the gap 12, but rather forms a protective cooling-air layer over the bevel 30 and then discharges onto the surface 22' around which the hot-gas stream 40 flows. On account of the selected orientation of the edge-cooling bore 62 and bevel 30, the cooling-air stream 64 discharges essentially parallel to the direction of the hot-gas stream, a factor which avoids undesirable vortices and aerodynamic losses and leads to an optimized action of the cooling air.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A segment arrangement for platforms, in particular in a gas turbine, along the surface of which a hot-gas stream flows, the segment arrangement comprising: segments arranged next to one another and in each case separated from one another by a gap, the hot-gas stream, in at least one section of the gap having a velocity component perpendicular to the direction of the gap from a first segment to a second segment, wherein, in said section, that edge of the surface of the second segment which faces the gap is bevelled or rounded off, and that edge of the surface of the first segment which faces the gap is positioned to direct the hot-gas stream above the edge of the second segment.

2. The segment arrangement as claimed in claim 1, wherein, in a second section of the gap, the hot-gas stream has a velocity component perpendicular to the direction of the gap from the second segment to the first segment, and, in said section, that edge of the surface of the first segment which faces the gap is bevelled or rounded off, and that edge of the surface of the second segment which faces the gap is positioned to direct the hot-gas stream above the edge of the first segment.

3. The segment arrangement as claimed in claim 2, including a transition region (72) in which the hot-gas stream flows essentially in the direction of the gap, the transition region being arranged between the first and second sections, and wherein, in said transition region, the bevel or rounded-off portion of the first and second sections is gradually reduced to zero.

4. The segment arrangement as claimed in claim 1, wherein the said edge of the segment being bevelled at an angle $\alpha$, and $\alpha$ being between 1° and 60°.

5. The segment arrangement as claimed in claim 4, wherein the transition between the bevelled surfaces and the inside of each segment is rounded off in the form of an elliptical section.

6. The segment arrangement as claimed in claim 1, wherein the said edges of the segments are rounded off in the form of a quarter ellipse, and the ellipse having semiaxes of length L and T respectively, the angle $\alpha$=arc tan T/L being between 1° and 60°.

7. The segment arrangement as claimed in claim 1, wherein a sealing strip is arranged in a recess in the gap, and the depth of the bevel or rounded-off portion always being selected to be so small that the bevel or rounded-off portion does not reach the recess.

8. The segment arrangement as claimed in claim 1, in which, each case in that section of a segment which, at the gap, is opposite that section of a further segment which is provided with a bevel, at least one edge-cooling bore, along that edge of the said segment which faces the gap, connects a cooling-air chamber, allocated to the said segment, to the inside of the gap, and in which the axes of the edge-cooling bores enclose with the surface of the said segment an angel $\beta$, $\beta$ lying at an interval of 30° around the angle $\alpha$ defined by the bevel.

9. The segment arrangement as claimed in claim 1, wherein the said edge of the segment is bevelled at an angle $\alpha$, and $\alpha$ being between 20° and 40°.

10. The segment arrangement as claimed in claim 1, wherein the said edges of the segments are rounded off in the form of a quarter ellipse, and the ellipse having semiaxes of length L and T respectively, the angle $\alpha$=arc tan T/L is between 20° and 40°.

11. A segment arrangement for platforms for supporting airfoils in a gas turbine in which a hot gas stream flows along the surface of platforms, the segment arrangement comprising: first and second segments arranged adjacent to one another and in each case separated from one another by a gap, the first and second segments having cooling-air chambers, the gap having a first section and a second section, the hot-gas stream at the first section of the gap having a velocity component substantially perpendicular to the direction of the gap when the hot gas stream is flowing from the first segment to the second segment, the hot-gas stream having a velocity component perpendicular to the direction of the gap from the second segment to the first segment, and in the second section, along that edge of the second segment which faces the gap, at least one film-cooling bore in the second segment, for conducting cooling air to the surface subjected to the hot-gas stream, and at least one of said segments having at least one edge cooling bore therein along the edge that faces the gap for conducting cooling air from one of the cooling-air chambers to the inside of the gap.

12. A segment arrangement for platforms for supporting airfoils in gas turbine in which a hot gas stream flows along the surface of the platforms, the segment arrangement comprising: first and second segments arranged adjacent to one another and in each case separated from one another by a gap, the first and second segments having cooling-air chambers, the gap having a first section and a second section, the hot-gas stream at the first section of the gap having a velocity component substantially perpendicular to the direction of the gap when the hot-gas stream is flowing from the first segment toward the second segment, and the hot-gas stream at the second section of the gap having a velocity component substantially perpendicular to the direction of the gap from the second segment to the first segment, and, in the first section of the gap along the edge of the first segment which faces the gap, at least one film-cooling bore in the first segment for conducting cooling air from one of the cooling-air chambers toward the surface subjected to the hot gas stream for displacing the gas stream away from the edge of the gap, and, the second section of the gap, along that edge of the second segment which faces the gap, having at least one film-cooling bore for conducting cooling air from one of the cooling-air chambers to the surface subjected to the hot-gas stream for displacing the gas stream away from the edge of the gap, and wherein a transition region in which the hot-gas stream flows essentially in the direction of the gap is arranged between the first and second sections, and wherein in said transition region, along those edges of the two segments which face the gap, at least one edge-cooling bore connects at least one of the cooling-air chambers to the inside of the gap, and at least one of said segments having at least one edge cooling bore therein along the edge that faces the gap for conducting cooling air from one of the cooling-air chambers to the inside of the gap.

13. The segment arrangement as claimed in claim 12, including a plurality of film-cooling bores, and in which the axes of the film-cooling bores point toward the gap and enclose with the surface of the segment containing said film-cooling bores an angle of between 10° and 50°.

14. The segment arrangement as claimed in claim 12, in which in each case that section of the edge which is acted upon by the hot-gas stream is bevelled or rounded off, and in which, in said transition region, the bevel or rounded-off portion of the said sections is gradually reduced to zero.

15. The segment arrangement as claimed in claim 12, in which in each case that section of the edge of each segment which is acted upon by the hot-gas stream in rounded off, the said edges of the segments being rounded off in the form of a quarter ellipse, and the ellipse having semiaxes of length L and T respectively, the said edges of the segments are rounded off in the form of a quarter ellipse, and the ellipse having semiaxes of length L and T respectively, the agle$\alpha$= are tan T/L are between 1° and 60°.

16. The segment arrangement as claimed in claim 12, wherein in each case that section of the edge of each segment which is acted upon by the hot-gas stream is rounded off, the depth of the rounded-off portions being selected in such a way that they do not reach the openings of the edge-cooling bores at the inside of the gap, and in which the inside of each segment provided with film-cooling bores is provided with a concave recess.

17. The segment arrangement as claimed in claim 12, wherein the axes of the edge-cooling bores point toward the gap and enclose the surface of the segment containing said edge-cooling bores at an angle of between 5° and 50°.

18. The segment arrangement as claimed in claim 12, wherein the edge-cooling bores are funnel shaped adjacent the surface of the segment.

19. The segment arrangement as claimed in claim 12, including a plurality of film-cooling bores, in which the axes of the film-cooling bores point toward the gap and enclose with the surface of the segment containing said film-cooling bores and angle of between 25° and 45°.

20. A segment arrangement for platforms for supporting airfoils in a gas turbine, in which a hot-gas stream flows along the surface of the platforms, the segment arrangement comprising: a plurality of segment arranged adjacent to one another and in each case separated from one another by a gap, the hot-gas stream, in at least one section of the gap, having a velocity component substantially perpendicular to the direction of the gap when the hot-gas stream is flowing from a first segment to a second segment, wherein, said section includes a plurality of film-cooling bores along the edge of the first segment which faces the gap for conducting cooling air to the surface subjected to the hot-gas stream for displacing the gas stream away from the edge of the gap, and in which the film-cooling bores are of cylindrical shape on the side facing the cooling-air chambers and have a funnel-shaped opening on the hot-gas side.

21. A segment arrangement for platforms for supporting airfoils in a gas turbine, in which a hot-gas stream flows along the surface of the platforms, the segment arrangement comprising: a plurality of segments arranged adjacent to one another and in each case separated from one another by a gap, the hot-gas stream, in at least one section of the gap, having a velocity component substantially perpendicular to the direction of the gap when the hot-gas stream is flowing form a first segment to a second segment, wherein, said section includes a plurality of film-cooling bores along the edge of the first segment which faces the gap for conducting cooling air to the surface subjected to the hot-gas stream for displacing the gas stream away from the edge of the gap, and in which the film-cooling bores and edge-cooling bores are from the edge of the gap, and in which the film-cooling bores and edge-cooling bores are staggered laterally.

22. The segment arrangement as claimed in claim 21, in which the film-cooling bores and the edge-cooling bores have a lateral setting angle γ, and in which the lateral setting angle γ is selected in such a way that the axes of the film-cooling bores of the edge-cooling bores point essentially in the direction of the hot-gas stream.

23. The segment arrangement as claimed in claim 5, wherein the transition between the bevelled surfaces and the non-bevelled surfaces of each segment is rounded off in the form of an elliptical section.

* * * * *